(No Model.)

F. H. RICHARDS.
WEIGHING APPARATUS OR PLANT.

No. 600,031.   Patented Mar. 1, 1898.

Witnesses:
C. F. Schmelz
Fred. J. Dole.

Inventor:
F. H. Richards.

(No Model.) 3 Sheets—Sheet 2.

F. H. RICHARDS.
WEIGHING APPARATUS OR PLANT.

No. 600,031. Patented Mar. 1, 1898.

Witnesses:
C. F. Schmelz
Fred. J. Dole.

Inventor:
F. H. Richards.

(No Model.)  3 Sheets—Sheet 3.
F. H. RICHARDS.
WEIGHING APPARATUS OR PLANT.
No. 600,031. Patented Mar. 1, 1898.
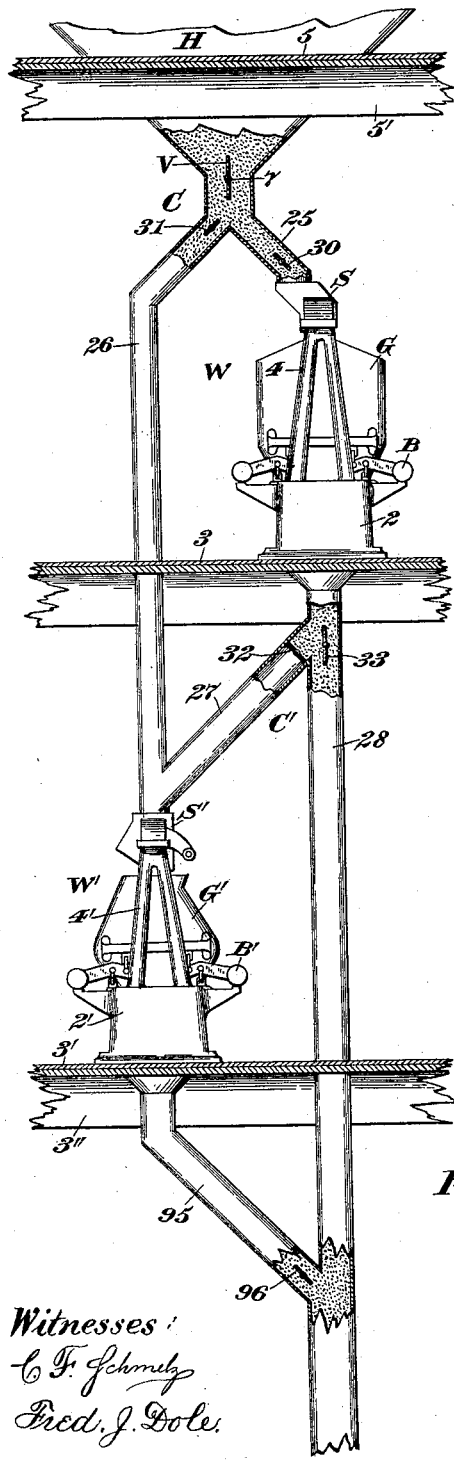
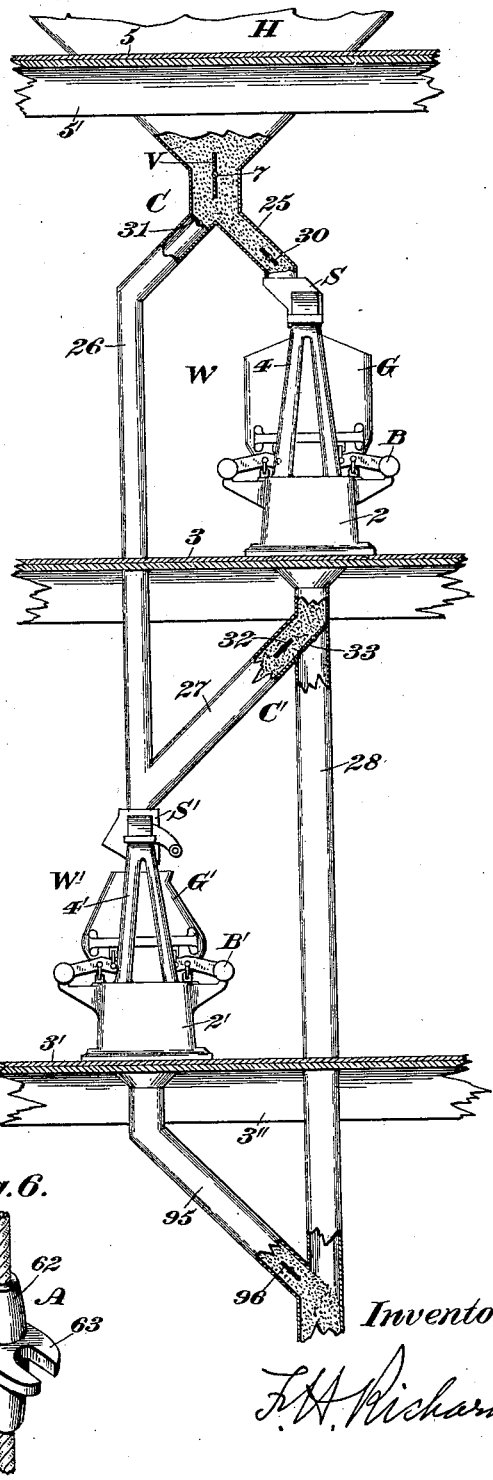
Witnesses:
C. F. Schmelz
Fred. J. Dole.
Inventor:
F. H. Richards.

UNITED STATES PATENT OFFICE.

FRANCIS H. RICHARDS, OF HARTFORD, CONNECTICUT.

WEIGHING APPARATUS OR PLANT.

SPECIFICATION forming part of Letters Patent No. 600,031, dated March 1, 1898.

Application filed August 19, 1897. Serial No. 648,799. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing Apparatus or Plants, of which the following is a specification.

This invention relates to weighing apparatus or plants; and it comprises in its organization a plurality of weighing-machines of ordinary construction, a series of supply-conduits leading to the respective weighing-machines, a conduit leading from one of the machines to the other, and means, such as a system of valves or gates, for regulating the passage of material through the several conduits, whereby either or both of the weighing-machines can act independently of the other or so that one machine can discharge its load or contents into the other to verify or substantiate the accuracy of the work performed or for other reasons, my present improvements being especially adapted for use in elevators and mills or in a shop for testing weighing-machines.

Figures 1, 7, 8:
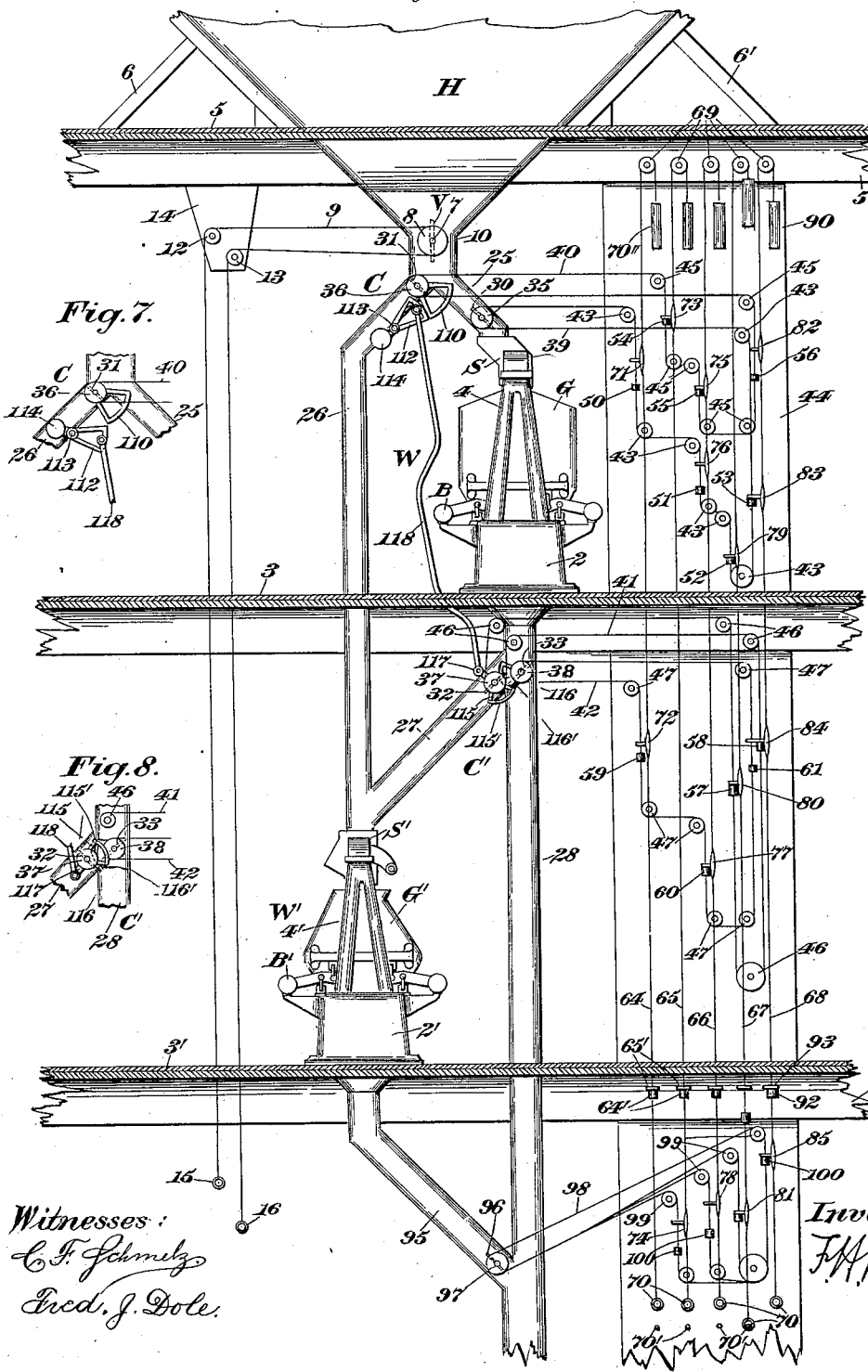

In the drawings accompanying and forming part of this specification, Figure 1 is a side elevation of my improved weighing apparatus or plant, showing a means for operating the several supply-controlling valves. Figs. 2, 3, 4, and 5 are similar views with the valve-actuating means removed and portions of the several conduits in section to show the valves in their open and closed positions. Fig. 6 is a detail view in perspective of an actuator for operating a valve, and Figs. 7 and 8 are detail views of interlocking stop mechanism.

Similar characters designate like parts in all the figures of the drawings.

For convenience in illustrating the nature and purpose of my present improvements I have represented in Fig. 1 of the drawings a series of weighing-machines (two in number) constructed substantially in accordance with Letters Patent No. 548,840, granted to me October 29, 1895, to which reference may be had, said machines being designated, respectively, by W and W'.

The load-receiver of the weighing-machine W is designated by G, and the load-receiver of the weighing-machine W' by G', the two load-receivers being mounted on beam mechanism (designated in a general way, respectively, by B and B') mounted upon the two bases or beds 2 and 2', which in turn rest upon the floors 3 and 3' of a building.

Each of the machines is provided with the usual spouts (designated, respectively, by S and S') secured to the frameworks 4 and 4', respectively. The two spouts are supplied with material, as will hereinafter appear, and each is preferably furnished with a valve or analogous supply-controller, (not shown,) as indicated in the Letters Patent hereinbefore referred to.

The two weighing-machines W and W' are supplied with material from the bin or hopper H, of relatively large capacity, through the intervention of a series of conduits of some suitable character, the bin or hopper H passing through an aperture or opening in the floor 5 and being secured in place by a series of braces, as 6 and 6', attached to the floor.

The supply of material to one or both of the weighing-machines W and W' from the hopper H or analogous supply apparatus is governed by a main valve or gate, preferably of the "damper" type, as V, located in the throat or mouth of the hopper and pivoted thereto, as at 7, the projecting pivot being provided with a pulley or wheel 8, to the periphery of which, as at 10, the band or rope 9 is secured, the latter passing around the guide-rolls 12 and 13 on the hanger 14. The opposite ends of the pull band or rope, serving to operate the valve or gate V, are provided with handles 15 and 16 in the form of rings.

When the valve or gate V is open, as indicated in Fig. 1, and it is desired to shut the same for arresting the supply to two weighing-machines, it is simply necessary to pull down either of the branches of the band or rope 9 for a sufficient distance to impart a quarter-turn to the pulley 8, whereby the valve V will be moved to a horizontal position and will therefore cut off the supply. To open the valve, the other branch of the rope will be pulled down.

The bin or reservoir H constitutes a convenient means for containing and delivering a supply of material to the weighing-machines W and W', respectively, through the medium of a series of conduits, as 25 and 26, which in the construction illustrated form the branches of a two-way or duplex conduit C, the conduit or pipe 25 communicating with the spout S, and the conduit or pipe 26 communicating with the spout S'.

The two-way or duplex conduit C, in the form of the invention represented, constitutes a fixed or integral extension of the hopper or reservoir H, although it is apparent that other kinds of conduits could be employed for delivering material from the hopper H to the two machines without departing from the scope of the invention.

A third conduit, in addition to the two aforesaid leading from the hopper H to the weighing mechanism W and W', respectively, is provided, it leading from the primary weighing mechanism W to the secondary weighing mechanism W'. Said conduit is designated by 27, and it forms in effect a branch of the conduit 26 and also of the conduit 28, which is situated below the base 2 of the weighing-machine W and communicates therewith, a series of valves being situated in the several conduits to control the supply of material to the respective weighing-machines or the supply of material from one machine or the other.

Figure 2:
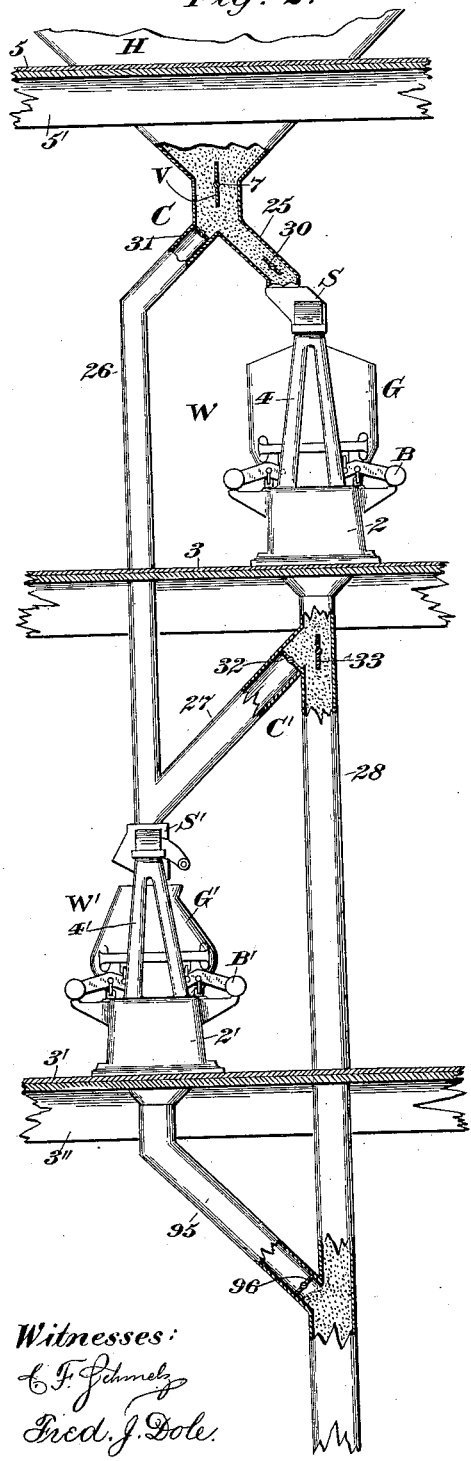

By the improvements illustrated and as represented in Figs. 1 and 5 material may be delivered to the weighing mechanism W and discharged thereby and then delivered into the weighing mechanism W'; or, as indicated in Fig. 2, the weighing-machine W may operate independently of the weighing-machine W', or the weighing-machine W' may act independently; or, as illustrated in Fig. 4, each weighing-machine may weigh independently of the other, the primary weighing-machine W, which is located on a higher horizontal plane or above the secondary weighing-machine W', in such case discharging into said secondary machine W'.

The means illustrated for regulating the passage of material through the several conduits consists of a series of stream-controllers, preferably in the form of damper-valves, (designated, respectively, by 30, 31, 32, and 33,) each consisting of flat plates pivoted in the conduits 25, 26, 27, and 28. The pivots of the several stream-controllers or valves have secured thereto a corresponding series of pulleys 35, 36, 37, and 38, serving as guides and around which are passed the bands or ropes, as 39, 40, 41, and 42, respectively, each of the bands being disposed in two or more different planes for a purpose that will hereinafter appear. The band 39 is also passed around a series of guides or rollers (each designated by 43) situated at suitable points on the board 44, extending between the several floors of the building, the bands 40, 41, and 42 being passed around a similar series of guides, as 45, 46, and 47, also mounted on the board 44. It will be evident that by pulling on any one of the bands or ropes 39, 40, 41, and 42 any one of the series of valves or gates 30, 31, 32, and 33 may be operated either to open or close the same.

The several bands 39, 40, 41, and 42, which may be of light wire and are preferably endless, are so wound about the supporting-guides thereof as to be disposed, preferably, in two or more vertical parallel planes, and each of them is equipped with a series of catch-faces or projections. When a projection on one part of a band is pulled down, a similar projection at another part thereof will be raised, the result being an operation of a valve. When the last-mentioned projection is actuated, the motion of the valve will be reversed. The band 39 carries a series of annular projections or sleeves 50, 51, 52, and 53. The band 40 is equipped with a series of projections 54, 55, and 56. The band 41 is furnished with the projections 57 and 58, and the band 42 is provided with the projections 59, 60, and 61.

For the purpose of engaging any one of the projections a multiplicity of actuators of suitable construction is provided. Each actuator being similar in construction, a detailed description of but one of them (see Fig. 6) is deemed necessary. The actuator shown in said Fig. 6 is designated by A, and consists of a sleeve 62 and a bifurcation 63, extending from said sleeve and between which a band is disposed. By pulling down on the rope to which the sleeve portion 62 of the actuator is secured the bifurcation 63 will be carried against one of the projections on the bands to which I have referred, so as to move said projection in a coinciding direction, thereby operating a valve. The series of actuators is secured to a series of pull-cords or carriers, as 64, 65, 66, 67, and 68, passing around the guide-rollers 69 on the beam 5', said cords being provided at their lower ends with a series of handles, as 70, consisting of rings through which a finger can be passed to pull down any of the cords. The cord 64 is furnished with the actuators 71 and 72. The cord 65 has the actuators 73 and 74. The cord 66 is provided with the actuators 75, 76, 77, and 78. The cord 67 is furnished with the actuators 79, 80, and 81, and the cord 68 is equipped with the actuators 82, 83, 84, and 85.

The purpose of the actuators 74, 78, 81, and 85 will be hereinafter set forth. As hereinbefore described, with the organization of weighing-machines illustrated it is possible to obtain four different combinations, as illustrated, respectively, in Figs. 2, 3, 4, and 5.

Figure 3:
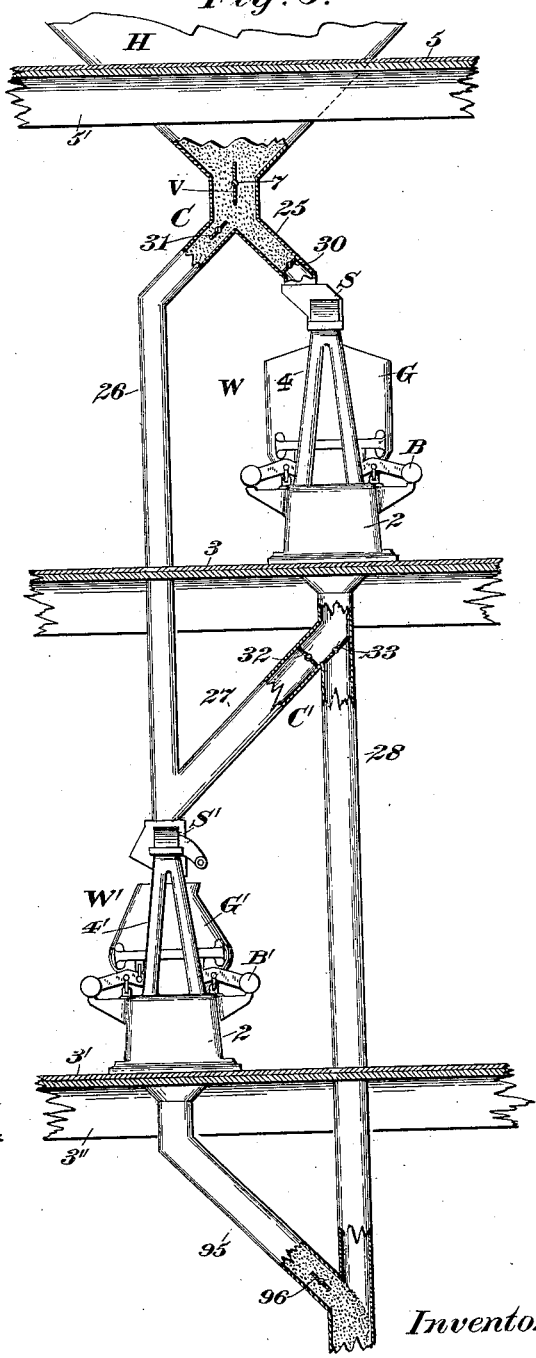

In Fig. 2 the weighing-machine W is weighing, in Fig. 3 the weighing-machine W' is weighing, in Fig. 4 each of the machines is weighing, and in Fig. 5 the weighing-machine W is weighing and discharging into the weighing mechanism W'. If the plant is working by any one of the modes illustrated in these four views and it is desired to operate the same in a different manner, the first step necessary to attain this end is to close all the valves above the two weighing-machines, which is accomplished by pulling down the cord 68 and then releasing the same. When said cord is pulled down, the actuator 82 will engage the projection 56 on the band 40, the actuator 83 will engage the projection 53 on the band 39, and the actuator 84 will engage the projections 58 and 61 on the bands 41 and 42, respectively, so that the several bands may be simultaneously operated to close the series of valves 30, 31, 32, and 33. As soon as the cord 68 is released the weight 90 at its upper end will return the several actuators to their primary positions (shown in Fig. 1) or until the projection 92 on said cord strikes the stop 93 on the beam 3''. All of the valves having been closed by the operation of the cord 68, it is assumed that the operation of the weighing-machine W, independently of the weighing-machine W' and without discharging the contents of the former into the latter or permitting the passage of material from the hopper or bin H into said machine W', as shown in Fig. 2, is desired. To accomplish this result, the handle 70 of the cord 64 will be grasped, it being understood that the projections 50 and 59 are in their highest positions and that the valves 30 and 33 are closed, as shown in Fig. 3, and pulled down, the actuators 71 and 72 thereby being carried against said projections to move them in a corresponding direction, thereby also elevating the projection 53, so that the latter can be subsequently engaged, if necessary, by the actuator 83, the projection 61 being also raised.

Should it be desired to work the combination illustrated in Fig. 3, the several valves will be simultaneously closed, and the second cord 65 of the series will be grasped to carry the actuator 73 against the projection 54 on the band 40, thereby opening the valve 31, it being understood that all of the other valves have been previously closed.

To operate each of the weighing-machines independently of the other when the several valves are closed, the cord 66 will be pulled down, thereby carrying the actuators 75, 76, and 77 against the projections 55, 51, and 60 on the bands 40, 39, and 42, whereby the valves 30, 31, and 33 will be simultaneously opened, the valve 32 being of course left in its closed position, so that the material cannot pass from the weighing-machine W to the weighing-machine W' through the conduit 27.

To discharge the loads from the weighing-machine W to the weighing-machine W', as represented in Fig. 5, the valves will all be again closed, after which the cord 67 will be pulled down, thereby carrying the actuators 79 and 80 against the projections 52 and 57, respectively, so that the valves 30 and 32 will be opened, as indicated in Figs. 1 and 5. When any one of the series of cords have been pulled down, the rings 70 thereon can be placed over corresponding stops 70' on the board 44, as shown by the cord 67 in Fig. 1. When any one of the cords is released, it, with the actuators thereon, is returned to the primary position by the weight 70'' or until the projection 64' on said cord strikes the stop 65' on the beam 3'', as shown by the cords 64, 65, and 66, Fig. 1. When the valves 30, 31, and 32 are shut, they will be located at a right angle or crosswise of the wall of the conduit inclosing the same, and when the valve 33 is shut, as shown in Fig. 3, for example, said valve will be in alinement with the branch conduit 27. When the valve 31 is shut, no material can flow down the conduit 26 into the weighing-machine W'. When the valve 30 is shut, the same result follows with respect to the weighing-machine W. When the valve 33 is shut, no material can flow down the discharge-conduit 28 from the weighing-machine W, but will be directed to the conduit 27 and from there to the weighing-machine W'. When the valve 32 is shut, no material can enter the conduit 27, but will be emptied into the conduit 28.

In the several figures I have illustrated a discharge-conduit 95, leading from the weighing-machine W' to the longitudinal conduit 28, which communicates with the machine W, said conduit 95 having near its lower end the valve 96, the pivot of which is furnished with a pulley 97, around which the cord 98 is passed, said cord being also passed around a series of guide-rollers 99 on the board 44 and furnished with a series of projections 100 on the several strands thereof adapted when all the valves are operated to be engaged by the actuators 74, 78, 81, and 85, either to open or close the valve 96, as occasion demands.

The valve 96 in the conduit 95 is adapted simply for safety to prevent any leakage from the secondary weighing-machine W' or from a point above the same from entering the lower end of the pipe 28 while the weighing-machine W is operating alone. The valve 96 remains closed, of course, when the cord 64 is pulled down to operate the weighing-machine W alone.

It is imperative that when the weighing-machine W is discharging into the weighing-machine W', as indicated in Figs. 1 and 5, the valves 31 and 33 should be closed, thereby to prevent material from the hopper H entering the conduit 26 or a load from the weighing-machine W passing into the branch 28 of the two-way conduit C', and for the purpose of insuring this object I provide the interlocking stop mechanism illustrated in Figs. 1, 7, and 8. The valve 31 has secured to its pivot the skeleton segment 110, coöperative with a similar device 112, pivoted at 113 to the conduit 26 and having the weighted arm 114, adapted to counterbalance the interlock 112. A similar pair of stops is shown at 115 and 116, respectively secured to the valves 32 and 33, the stop 115 having a crank-arm 117 connected by the longitudinal rod or connector 118 with the interlocking stops 112, as shown in Fig.

1. The interlocking stops 115 and 116 have along the working edges thereof the oppositely-disposed curved flanges 115' and 116', respectively.

The operation of the several stops is as follows: In Figs. 7 and 8, respectively, the two pairs of stops are shown occupying their ineffective positions, the valves coöperative therewith being shut. As soon as the valve 32 is opened, as indicated in Fig. 1, the interlocking stop 115 will be pulled down, thereby moving the flange 115' across the plane of movement of the coöperating flange 116', as indicated in Fig. 1, so that the valve 33 cannot be opened. As the interlocking stop 115 is operated with the valve 32 in the manner just specified, the rod 118 is thrust upward, thereby moving the stop 112 from the position shown in Fig. 7 to that illustrated in Fig. 1 or across the path of movement of the stop 110, so that the action of the latter, and consequently of the valve 31 connected therewith, will be prevented. When the valves are all closed for any one of the purposes hereinbefore set forth, the different stops will be returned to their initial positions. (Represented in Figs. 7 and 8.)

When the weighing-machines W and W' are individually working, it is essential that the contents of the primary weigher W should be prevented from passing toward the secondary weigher, and for this reason the several stops are so constructed and operative as to be reciprocally effective.

All the valves being closed and it being desired to use the two machines separately, the valves 30, 31, and 33 will be opened in the manner hereinbefore specified. On the opening of the valve 33 the stop 116 will be so swung as to carry the flange 116' under the flange 115', whereby the stop 115 cannot be moved, thereby blocking the downward movement of the stop 112 by reason of the connection 118. As the valve 31 is opened the stop 110 will be swung across the path of movement of the stop 112, so that the latter cannot move in an upward direction.

Having described my invention, I claim—

1. The combination of a plurality of weighing-machines; a series of conduits leading to the respective weighing-machines; a discharge-conduit leading from one of the weighing-machines directly to the other; and means for regulating the passage of material through the several conduits.

2. The combination of a plurality of weighing-machines; a series of conduits leading to the respective weighing-machines; a discharge-conduit leading from one of the weighing-machines directly to the other; a series of valves, one in each of the conduits; and means for operating one or more of the valves.

3. The combination of a plurality of weighing-machines; a series of conduits leading to the respective weighing-machines; a discharge-conduit leading from one of said machines directly to the other; and hand-operated means for regulating the passage of material through the several conduits.

4. The combination, with a hopper having a two-way conduit, of primary and secondary weighing-machines, the primary weighing-machine being located over the secondary weighing-machine and said machines being in position to receive material from the respective branches of said two-way conduit; a second two-way conduit located under the primary weighing-machine and one of its branches leading toward the secondary weighing-machine and the other branch being disposed in a different plane; a series of valves, one in each of the branches of said two-way conduits; and means for operating said valves.

5. The combination of a conduit; a weighing-machine in position to receive material therefrom; a stream-controller in the conduit, and located to govern the quantity of material supplied to said weighing-machine; a plurality of guides; a band passed around the guides; a catch-face on the band; and means for engaging the catch-face.

6. The combination of a conduit; a weighing-machine in position to receive material from said conduit; a stream-controller in the latter and located to govern the quantity of material supplied to said weighing-machine; a plurality of guides; a band passed around the guides and disposed in two different planes; a series of catch-faces on the bands; and means for engaging the catch-faces.

7. The combination of a conduit; a weighing-machine in position to receive material therefrom; a stream-controller in the conduit; and located to govern the quantity of material supplied to said weighing-machine; a plurality of guides, one of which is operative with the stream-controller; a band passed around the guides and disposed in two different planes; a series of catch-faces secured to the different portions of the band; and independently-operative actuators for engaging the respective catch-faces.

8. The combination of a conduit; a weighing-machine in position to receive material therefrom; a stream-controller; a plurality of guides, one of which is operative with the stream-controller; a band passed around the guides and having a catch-face; an actuator in position to engage the catch-face; and means for returning the actuator to its primary position.

9. The combination of a conduit; a weighing-machine in position to receive material therefrom; a stream-controller in the conduit; a plurality of guides, one of which is operative with the stream-controller; a band passed around the guides; a cord having a weight on one end; and an actuator on the cord, adapted to engage said catch-face.

10. The combination of a conduit; a weighing-machine in position to receive material therefrom; a stream-controller pivoted in the conduit; a pulley secured to the projecting pivot of the stream-controller; a guide; an endless band passed around the guide and pulley and having a catch-face; a pull-cord having a handle at one end and a weight at the other; and an actuator secured to the pull-cord and adapted to engage the catch-face on the operation of such cord.

11. The combination of a conduit; a weighing-machine in position to receive material therefrom; a stream-controller in the conduit; a plurality of guides, one of which is operative with the stream-controller; a band passed around the several guides and provided with a catch-face; and a pull-cord having an actuator adapted to engage the catch-face, such actuator consisting of a sleeve and a device extending therefrom, the sleeve being secured to the cord.

12. The combination of a conduit; a weighing-machine in position to receive material therefrom; a stream-controller in the conduit; a plurality of guides, one of which is connected with the stream-controller; a band passed around the several guides and provided with a projection; and a pull-cord having an actuator adapted to engage the projection, the actuator comprehending a bifurcation between the branches of which the band is located.

13. The combination of a conduit; a weighing-machine in position to receive material therefrom; a stream-controller in the conduit; a plurality of guides; an endless band passed around the guides and having a catch-face; a cord provided with an actuator adapted to engage said catch-face and having a projection; and a stop adapted to be engaged by the projection.

14. The combination of a plurality of weighing-machines; a series of conduits leading to the respective weighing-machines; a series of valves, one in each of the conduits; means for operating the valves; and means in position to block the opening movement of one of the valves when the other is open.

15. The combination of a plurality of weighing-machines; a series of conduits leading to the respective weighing-machines; a conduit leading from one of the weighing-machines to the other; a series of valves; and interlocking stop mechanism coöperative with said valves.

16. The combination with primary and secondary weighing-machines; of a two-way conduit, the respective branches of which lead to said weighing-machines; a second two-way conduit located under the primary weighing-machine, and one of its branches leading toward the secondary weighing-machine; a series of valves, one valve being located in each conduit; and interlocking stop mechanism coöperative with the several valves.

17. The combination with primary and secondary weighing-machines, of a two-way conduit, the respective branches of which lead to said weighing-machines; a pair of valves disposed in said branches, one of them being provided with a stop; a coöperating stop; a second two-way conduit located under the primary weighing-machine, one branch of which leads to the secondary weighing-machine; a pair of valves mounted in the branches of the last-mentioned two-way conduit; a second pair of stops coöperative with each other and with the last-mentioned valves, and one of them being connected with one of the first-mentioned stops.

FRANCIS H. RICHARDS.

Witnesses:
F. N. CHASE,
ANDREW FERGUSON.